(12) United States Patent
Tapse et al.

(10) Patent No.: US 12,088,877 B1
(45) Date of Patent: *Sep. 10, 2024

(54) METHODS AND APPARATUS FOR LOADING AND ROLL-OFF OF REFERENCE MEDIA ASSETS

(71) Applicant: The Nielsen Company (US), LLC, New York, NY (US)

(72) Inventors: Sandeep Tapse, Odessa, FL (US); Daniel Nelson, Tampa, FL (US); Raghuram Ranganathan, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,057

(22) Filed: Jun. 14, 2023

Related U.S. Application Data

(63) Continuation of application No. 17/538,813, filed on Nov. 30, 2021, now Pat. No. 11,689,764.

(51) Int. Cl.
*H04N 21/442* (2011.01)

(52) U.S. Cl.
CPC . *H04N 21/44213* (2013.01); *H04N 21/44222* (2013.01)

(58) Field of Classification Search
CPC .................. H04N 21/44213; H04N 21/44222
See application file for complete search history.

(56) References Cited

U.S. PATENT DOCUMENTS

| 4,677,466 | A | 6/1987 | Lert, Jr. et al. |
| 9,569,626 | B1* | 2/2017 | Brisebois ................ G06F 21/16 |
| 2005/0232411 | A1 | 10/2005 | Srinivasan et al. |
| 2016/0006841 | A1* | 1/2016 | Gurevich ............ G06F 16/2455 709/203 |
| 2018/0359042 | A1* | 12/2018 | Carroll ................. H04H 60/372 |

OTHER PUBLICATIONS

United States and Trademark Office, "Non-Final Office Action", issued in connection with U.S. Appl. No. 17/538,813, dated Oct. 5, 2022, 17 pages.

* cited by examiner

*Primary Examiner* — John W Miller
*Assistant Examiner* — Akshay Doshi

(57) ABSTRACT

Methods, apparatus, systems, and articles of manufacture are disclosed for loading and roll-off of reference media assets. Example apparatus disclosed herein are to determine whether a first condition to prune a reference media asset is satisfied, and in response to a determination that the first condition is satisfied, determine whether a second condition to prune the reference media asset is satisfied. Disclosed example apparatus are also to, in response to a determination that the second condition is satisfied: segment the reference media asset into a plurality of segments based on a length of the reference media asset, prune a first one of the segments, and retain a second one of the segments in a database to compare with meter data to credit media exposure associated with the reference media asset.

20 Claims, 10 Drawing Sheets

METHODS AND APPARATUS FOR LOADING AND ROLL-OFF OF REFERENCE MEDIA ASSETS

CROSS REFERENCE TO RELATED APPLICATIONS

This patent is a continuation of U.S. patent application Ser. No. 17/538,813, now U.S. Pat. No. 11,689,764, which was filed Nov. 30, 2021. Priority to U.S. patent application Ser. No. 17/538,813 is hereby claimed. U.S. patent application Ser. No. 17/538,813 is hereby incorporated herein by reference in its entirety.

FIELD OF THE DISCLOSURE

This disclosure relates generally to media identification systems and, more particularly, to methods and apparatus for loading and roll-off of reference media assets.

BACKGROUND

A media monitoring entity can generate audio signatures from a media signal. Audio signatures are a condensed reference that can be used to subsequently identify the media. The audio signatures can be hashed to allow faster matching in an audio signature database. In some examples, a media monitoring entity can monitor a media source feed (e.g., a television feed, etc.) to generate reference signatures representative of media presented via that media source feed. Such reference signatures can be compared to signatures generated by media monitors to credit exposure to the media.

BRIEF DESCRIPTION OF THE DRAWINGS

The figures are not to scale. In general, the same reference numbers will be used throughout the drawing(s) and accompanying written description to refer to the same or like parts.

Figure 1:
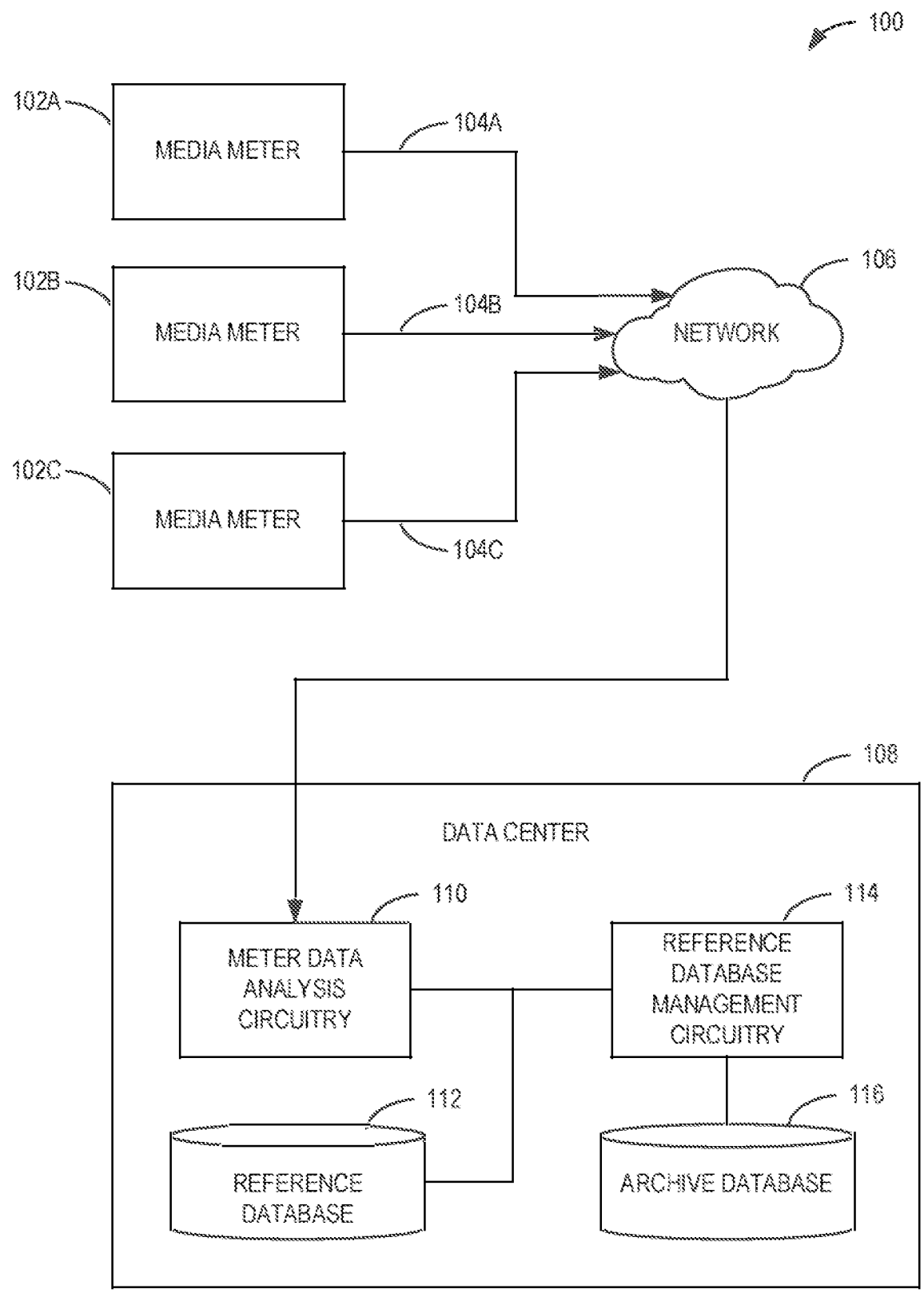
FIG. 1 is a block diagram of an example environment in which the teachings of this disclosure may be implemented.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

As used herein, the term "media" includes any type of content and/or advertisement delivered via any type of distribution medium. Thus, media includes television programming or advertisements, radio programming or advertisements, podcasts, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), identifying information (e.g., demographic information, a user identifier, a panelist identifier, a username, etc.), etc.

Audio watermarking is a technique used to identify media, such as television broadcasts, radio broadcasts, advertisements (television and/or radio), downloaded media, streaming media, prepackaged media, etc. Some audio watermarking techniques identify media by embedding one or more audio codes (e.g., one or more watermarks), such as media identifying information and/or an identifier that may be mapped to media identifying information, into an audio and/or video component of the media. In some examples, the watermark is embedded in the audio or video component so that the watermark is hidden. This embedding may be carried out utilizing psychoacoustic masking.

As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header).

To identify watermarked media, the watermark(s) are extracted and used to access a table of reference watermarks that are mapped to media identifying information. In some examples, media monitoring companies provide watermarks and/or watermarking devices to media providers with which to encode their media source feeds. In some examples, if a media provider provides multiple media source feeds (e.g., ESPN and ESPN 2, etc.), a media provider can provide a different watermark for each media source feed.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signature is found, the monitored media can be identified as corresponding to the particular reference media represented by the reference signature that matched the monitored signature. In some examples, signature matching is based on sequences of signatures such that, when a match between a sequence of monitored signatures and a sequence of reference signatures is found, the monitored media can be identified as corresponding to the particular reference media represented by the sequence of reference signatures that matched the sequence of monitored signatures. Because attributes, such as an identifier of the media, a presentation time, a broadcast channel, etc., are collected for the reference signature, these attributes may then be associated with the monitored media whose monitored signature(s) matched the reference signature(s). Example systems for identifying media based on codes and/or signatures are long known and were first disclosed in Thomas, U.S. Pat. No. 5,481,294, which is hereby incorporated by reference in its entirety.

Media monitoring entities (e.g., The Nielsen Company (US), LLC, etc.) desire knowledge regarding how users interact with media devices such as smartphones, tablets, laptops, smart televisions, etc. In some examples, media monitoring entities monitor media presentations made at the media devices to, among other things, monitor exposure to advertisements, determine advertisement effectiveness, determine user behavior, identify purchasing behavior associated with various demographics, etc. Media monitoring entities can provide media meters to people (e.g., panelists) which can generate media monitoring data based on the media exposure of those users. Such media meters can be associated with a specific media device (e.g., a television, a mobile phone, a computer, etc.) and/or a specific person (e.g., a portable meter, etc.).

Media monitoring entities can generate media reference databases that can include unhashed signatures, hashed signatures, and watermarks. These references are generated by a media monitoring entity (e.g., at a media monitoring station (MMS), etc.) by monitoring a media source feed, identifying any encoded watermarks and determining signatures associated with the media source feed. In some examples, the media monitoring entity can hash the determined signatures. Additionally or alternatively, the media monitoring entities generate reference signatures for downloaded reference media (e.g., from a streaming media provider), reference media transmitted to the media monitoring entity from one or more media providers, etc. That is, the media monitoring entities can generate reference signatures of media that is not live broadcasted. In some examples, media that is not live broadcasted includes a subscription video on demand (SVOD) asset. As used herein, a "media asset" refers to any individual, collection, or portion/piece of media of interest (e.g., a commercial, a song, a movie, an episode of television show, etc.). Media assets can be identified via unique media identifiers (e.g., a name of the media asset, a metadata tag, etc.). Media assets can be presented by any type of media presentation method (e.g., via streaming, via live broadcast, from a physical medium, etc.).

The reference database can be compared (e.g., matched, etc.) to media monitoring data (e.g., watermarks, unhashed signatures, hashed signatures, etc.) gathered by media meter(s) to allow crediting of media exposure. Monitored media can be credited using one, or a combination, of watermarks, unhashed signatures, and/or hashed signatures. In some examples, media monitoring entities store generated reference databases and gathered monitoring data on cloud storage services (e.g., AMAZON WEB SERVICES®, etc.). However, over time, the number of stored references media assets will continue to grow until the reference database include the entire universe of media assets to match. An increased size of the reference database can cause matching performance to suffer due to the larger quantity of data to search through.

In some examples, rolling off (e.g., removing) reference media assets from the reference database will help to avoid storing too many reference media assets and causing worsening matching performance. However, there are difficulties in determining when to remove reference media assets and determining which of the reference media assets should be removed from the reference database. For example, the reference media assets could be removed after a certain amount of time. Such an approach could cause loss of crediting for reference media assets that can still contribute to media ratings if people are still being exposed to the media asset after the roll-off However, if people are not being exposed to a reference media asset or the reference media asset is no longer available for exposure, keeping the reference media asset in the reference database for an infinite amount of time would be counterproductive to maintaining matching performance as the ever increasing amount of reference media assets may lead to an unmanageable reference database.

Methods and apparatus disclosed herein load and roll-off of reference video-on-demand media assets. Example techniques disclosed herein roll-off (remove) reference media assets from the reference database based on conditions that help to reduce to total number of reference media assets while avoiding, or at lessening, any potential loss of crediting. Example techniques disclosed herein look at the history of exposure for the reference media assets during a period of time (e.g., in the last few days, in the last few weeks, etc.). Example technique disclosed herein determine if the history of the exposure for one of the reference media assets satisfy an exposure threshold to determine which of the reference media assets are being credited for media exposure events. Example techniques disclosed herein determine which of the reference media assets should be rolled-off (removed) from the reference database based on whether their history of exposures satisfy the exposure threshold. Example techniques disclosed herein divide the reference media assets into segments, and some of the segments are kept while the rest are removed from the reference database. For example, in a 90 minute television program that is being removed from the reference database, the television program can be divided into one minute segments, and a portion of the segments can be kept in the reference database (e.g., 2-3 minute segment, 7-8 minute segment, 15-16 minute segment, 28-29 minute segment, 44-45 minute segment, etc.). Example techniques disclosed herein keep some of the segments of the removed reference media assets to keep some of the reference media asset available for matching to avoid any loss of crediting for exposures to any removed reference media assets. Example techniques disclosed herein keep an identifiable amount of the rolled-off reference media assets, although not the entire rolled-off reference media asset, thereby saving storage space and maintain performance in the matching process.

Example techniques disclosed herein store archives of the full reference media assets that are removed from the reference database. Example techniques disclosed herein keep some of the segments of the removed reference media assets to allow for crediting of media exposure to the reference media asset even after removal. Example techniques disclosed herein keep track of the history of exposure for the removed reference media assets. If the history of exposure for a removed reference media asset does satisfy the exposure threshold, example techniques disclosed herein access the archives of the full reference media asset and restore the full reference media asset in the reference database in place of the segmented reference media asset.

FIG. 1 is a block diagram of an example environment 100 in which the teachings of this disclosure may be implemented. The example environment 100 includes an example first media meter 102A, an example second media meter 102B and an example third media meter 102C, which output example first monitoring data 104A, example second monitoring data 104B, and example third monitoring data 104C, respectively, to an example network 106. The environment 100 further includes an example data center 108, which includes example meter data analysis circuitry 110, an example reference database 112, example reference database management circuitry 114, and an example archive database 116.

The example media meters 102A, 102B, 102C collect media monitoring information. In some examples, the media meters 102A, 102B, 102C are associated with (e.g., installed on, coupled to, etc.) respective media devices. For example, a media device associated with one of the media meters 102A, 102B, 102C presents media (e.g., via a display, etc.). In some examples, the media device associated with one of the media meters 102A, 102B, 102C additionally or alternatively presents the media on separate media presentation equipment (e.g., speakers, a display, etc.). For example, the media device(s) associated with the media meters 102A, 102B, 102C can include a personal computer, an Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), televisions, desktop computers, laptop computers, servers, etc. In such examples, the media meters 102A, 102B, 102C can have direct connections (e.g., physical connections) to the devices to be monitored, and/or may be connected wirelessly (e.g., via Wi-Fi, via Bluetooth, etc.) to the devices to be monitored.

Additionally or alternatively, in some examples, one or more of the media meters 102A, 102B, 102C are portable meters carried by one or more individual people. In the illustrated example, the media meters 102A, 102B, 102C monitor media presented to one or more people associated with the media meters 102A, 102B, and 102C and generate the example monitoring data 104A, 104B, 104C. In some examples, monitoring data 104A, 104B, 104C generated by the media meters 102A, 102B, 102C can determine signatures associated with the presented media. For example, the media meters 102A, 102B, 102C can determine a signature (e.g., generate signatures, extract signatures, etc.) associated with the presented media. Such signatures may be referred to as monitored media signatures or monitored signatures as they are determined from media monitored by the media meters 102A, 102B, 102C. Example signature generation techniques that may be implemented by the media meters 102A, 102B, 102C include, but are not limited to, examples disclosed in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Pat. No. 9,438,940 issued to Nelson on Sep. 6, 2016; U.S. Pat. No. 9,548,830 issued to Kariyappa et al. on Jan. 17, 2017; U.S. Pat. No. 9,668,020 issued to Nelson et al. on May 30, 2017; U.S. Pat. No. 10,200,546 issued to Nelson et al. on Feb. 5, 2019; U.S. Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S. Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008.

Accordingly, the monitoring data 104A, 104B, 104C can include monitored media signatures and/or monitored media watermarks representative of the media monitored by the media meters 102A, 102B, 102C. In some examples, the monitoring data 104A, 104B, 104C is associated with a discrete, measurement time period (e.g., five minutes, ten minutes, etc.). In such examples, the monitoring data 104A, 104B, 104C can include a sequences of monitored media signatures associated with media asset(s) (or portions thereof) presented by the media devices monitored by the media meters 102A, 102B, 102C.

The example network 106 is a network used to transmit the monitoring data 104A. 104B. 104C to the data center 108. In some examples, the network 106 can be the Internet or any other suitable external network. In other examples, the network 106 can be a cable broadcast system and the monitoring data 104A, 104B, 104C could be return path data (RPD). In other examples, any other suitable means of transmitting the monitoring data 104A, 104B, 104C to the data center 108 can be used.

The example data center 108 is an execution environment used to implement the example meter data analysis circuitry 110, the example reference database 112, the example reference database management circuitry 114, and the example archive database 116. In some examples, the data center 108 is associated with a media monitoring entity. In some examples, the data center 108 can be a physical processing center (e.g., a central facility of the media monitoring entity, etc.). Additionally or alternatively, the data center 108 can be implemented via a cloud service (e.g., AWS™, etc.). In the illustrated example, the data center 108 can further store and process generated watermark and signature reference data.

The example meter data analysis circuitry 110 processes the gathered media monitoring data to detect, identify, credit, etc. respective media assets and/or portions thereof (e.g., media segments) associated with the corresponding monitoring data 104A, 104B, 104C. For example, the meter data analysis circuitry 110 can compare the monitoring data 104A, 104B, 104C to generated reference data to determine what respective media assets and/or media segments are associated with the corresponding monitoring data 104A, 104B, 104C. The meter data analysis circuitry 110 of the illustrated example also analyzes the monitoring data 104A, 104B. 104C to determine if a media asset, and/or particular portion(s) (e.g., segment(s)) thereof, is to be credited as a media exposure represented in the monitoring data 104A, 104B, 104C. An example implementation of the meter data analysis circuitry 110 is described below in conjunction with FIG. 2.

The example reference database 112 includes reference signatures, reference watermarks, and other reference data created or otherwise obtained by the data center 108 to be used to identify and/or represent the reference media assets. In some examples, the media monitoring entity associated with the reference database 112 can directly monitor media source feeds to generate reference signatures. Additionally or alternatively, the media monitoring entity associated with the reference database 112 can generate reference signatures from downloaded reference media, etc. In examples disclosed herein, reference signatures are generated using the same or similar techniques as the monitored media signatures, such that the monitored media signatures and reference signatures of the same asset match. In some examples, each reference signature stored in the reference database 112 is associated with a specific reference media asset, such as, but not limited to, episodes of television programs (e.g., episodes of The Crown, Game of Thrones, The Office, etc.), movies of a movie collection (e.g., The Marvel Cinematic Universe, etc.), an advertisement, etc.

The example reference database management circuitry 114 perform reference media asset evaluation on the reference media assets stored in the example reference database 112. In some examples, the example reference database management circuitry 114 tracks the amounts of time (also referred to as durations of time, lengths of time, etc.) each of the reference media assets have been stored in the reference database 112. For example, the reference database management circuitry 114 tracks a first amount of time a first reference media asset has been stored in the reference database 112, a second amount of time a second reference media asset has been stored in the reference database 112, a third amount of time a third reference media asset has been stored in the reference database 112, etc. The example reference database management circuitry 114 triggers the performance of reference media asset evaluation when the amount of time satisfies (e.g., is equal to or greater than) a threshold. In some examples, the reference database management circuitry 114 triggers the performance of reference media asset evaluation for one reference media asset when the amount of time associated with the one reference media asset satisfies (e.g., is equal to or greater than) the threshold. In some examples, the reference database management circuitry 114 triggers the performance of the reference media asset evaluation for a group of reference media assets when the amounts of time associated with each of the reference media assets satisfy (e.g., is equal to or greater than) the threshold. In some examples, the reference database management circuitry 114 triggers the performance of the reference media asset evaluation for all of the reference media assets stored in the reference database 112 when at least one amount of time associated with at least one reference media asset satisfies (e.g., is equal to or greater than) the threshold.

The example reference database management circuitry 114 access the exposure crediting history for the reference media assets from the example meter data analysis circuitry 110. In some examples, the reference database management circuitry 114 access exposure crediting histories for each of the reference media assets. In some examples, the reference database management circuitry 114 access exposure crediting history from the example meter data analysis circuitry 110 that includes the exposure crediting history of all of the reference media assets. The example reference database management circuitry 114 access the exposure crediting history for a period of time (e.g., in the last few days, in the last few weeks, etc.). The example reference database management circuitry 114 determines exposure frequencies for the reference media assets and determines if the exposure frequencies satisfy an exposure threshold. The example reference database management circuitry 114 determines if the reference media assets should be rolled-off (removed) from the example reference database 112 based on whether the exposure frequencies satisfy the exposure threshold. An example implementation of the reference database management circuitry 114 is described below in conjunction with FIG. 3.

The example archive database 116 includes reference signatures created or otherwise obtained by the data center 108 and stored in the example reference database 112. The example archive database 116 includes the archived, full versions of the generated reference signatures created or otherwise obtained by the data center 108. In some example, when the example reference database management circuitry 114 rolls-off/removes reference media assets from the example reference database, a complete version of the reference media asset is stored in the archive database 116 as an archive. For example, if the reference database management circuitry 114 needs to reinstate a reference media asset to the reference database 112, the reference database management circuitry 114 access the archived, complete version of the reference media asset to store it in the reference database 112. In some examples, the adjusted archive database 116 can include a library (e.g., database, table, etc.) of archived, full versions of the reference signatures.

Figure 2:
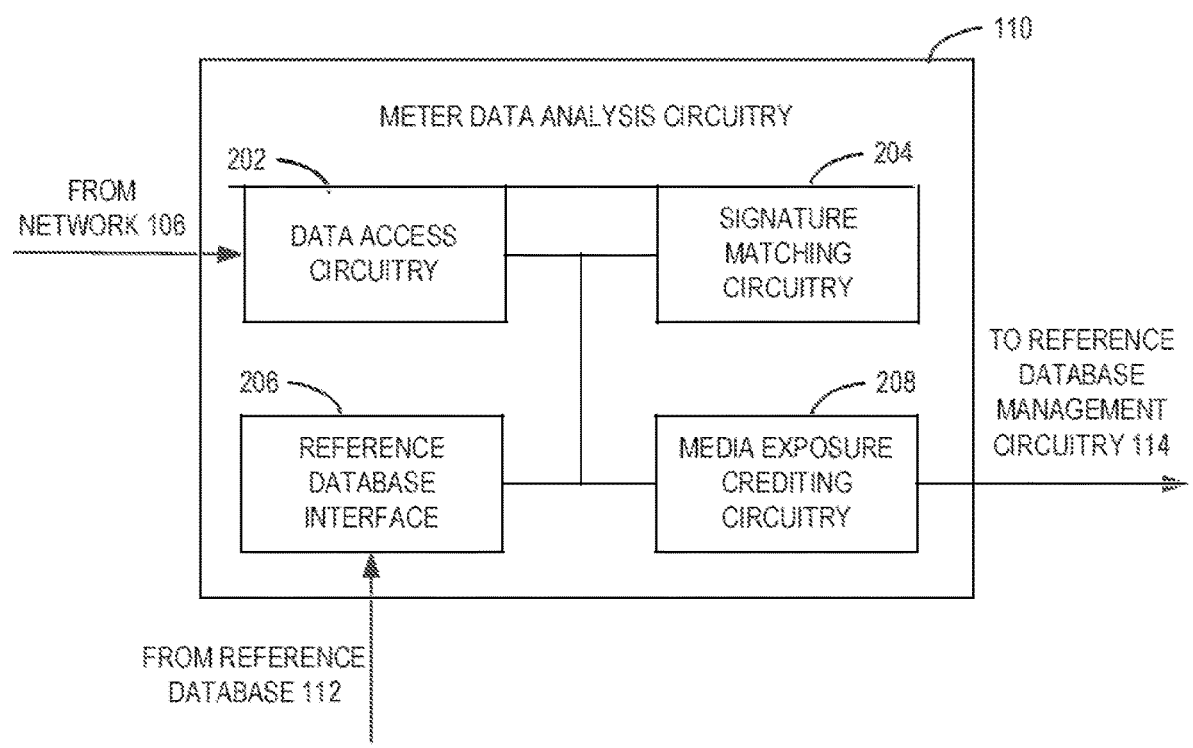
FIG. 2 is a block diagram of an example implementation of example meter data analysis circuitry included in the example environment of FIG. 1.

FIG. 2 is a block diagram of an example implementation of a meter data analysis circuitry 110 included in the example environment 100 of FIG. 1. The example meter data analysis circuitry 110 includes an example data access circuitry 202, an example signature matching circuitry 204, an example reference database interface 206, and an example media exposure crediting circuitry 208.

The example data access circuitry 202 collects the monitoring data (e.g., the monitoring data 104A, 104B, 104C of FIG. 1 from the example network 106. In some examples, the data access circuitry 202 can convert the monitoring data 104A, 104B, 104C into a format readable by the meter data analysis circuitry 110. In some examples, the data access circuitry 202 can be in continuous communication with the network 106, the first media meter 102A, the second media meter 102B and/or the third media meter 102C. In some examples, the data access circuitry 202 can be in intermittent (e.g., periodic or aperiodic) communication with the network 106, the first media meter 102A, the second media meter 102B and/or the third media meter 102C. The example data access circuitry obtains the sequences of monitored media signatures from the monitoring data 104A, 104B, 104C.

The example signature matching circuitry 204 of the illustrated example of FIG. 2 compares the monitored media signatures in the example monitoring data 104A, 104B, 104C to the reference signatures in the example reference database 112 of FIG. 1 to identify media assets associated with monitoring data 104A, 104B, 104C. For example, the signature matching circuitry 204 can determine if the monitored media signatures of the monitoring data 104A, 104B, 104C match any reference signatures stored in the reference database 112. In some examples, some or all of the monitored media signatures of the monitoring data 104A, 104B, 104C can match with corresponding reference signatures in the reference database 112 that represent a reference media asset (e.g., reference signatures associated with a television episode, etc.). In some examples disclosed herein, the signature matching circuitry 204 may perform matching using any suitable means (e.g., linear matching, hashed matching, etc.). The example signature matching circuitry 204 identifies the reference media assets associated with the matches between the monitored media signatures of the monitoring data 104A, 104B, 104C and the reference signatures in the reference database 112.

The example reference database interface 206 obtains reference signatures, reference watermarks, and other reference data associated with the reference media assets from the example reference database 112 of FIG. 1. In some examples, the database interface 206 provides the example signature matching circuitry 204 and the example media exposure crediting circuitry 208 with access to the reference media assets and associated data stored in the example reference database 112.

The example media exposure crediting circuitry 208 uses identification data associated with the reference media assets identified by the signature matching circuitry 204 to credit the media exposure of the reference media assets to user(s) associated with the media meters 102A, 102B, 102C. In some examples, the identification data includes associations between the media monitoring data and particular reference media assets. In some examples, the media exposure crediting circuitry 208 credits the media exposure to the reference media asset associated with reference data (e.g., reference signature, reference watermarks, etc.) determined to match the monitored media data (e.g., monitored media signatures, etc.).

Figure 3:
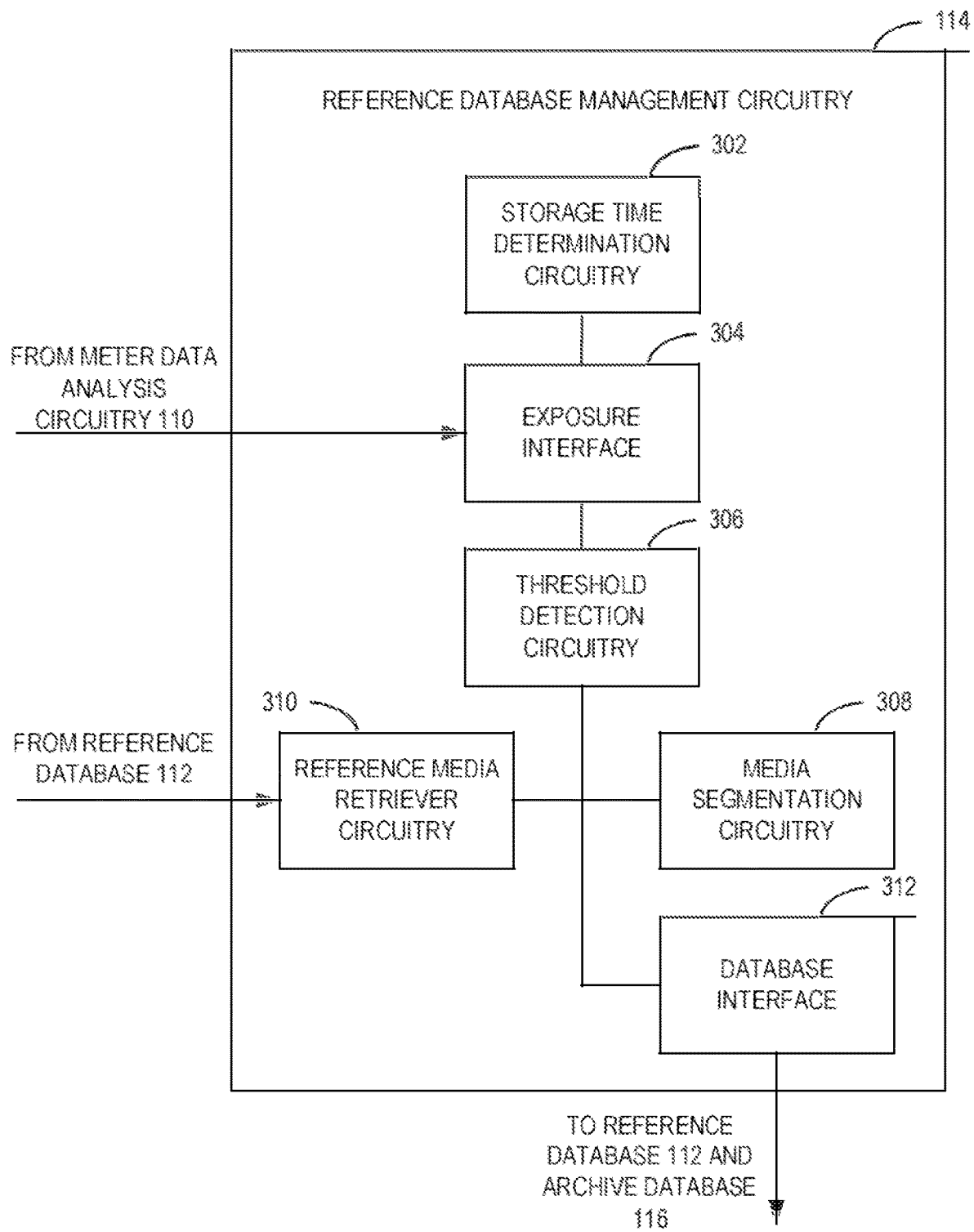
FIG. 3 is a block diagram of an example implementation of example reference database management circuitry included in the example environment of FIG. 1.

FIG. 3 is a block diagram of an example implementation of a reference database management circuitry 114 included in the example environment 100 of FIG. 1. The example reference database management circuitry 114 includes example storage time determination circuitry 302, an example exposure interface 304, example threshold detection circuitry 306, example media segmentation circuitry 308, example reference media retriever circuitry 310, and an example database interface 312.

The example storage time determination circuitry 302 determines and tracks the amount of time the reference media assets have been stored in the reference database 112. For example, the storage time determination circuitry 302 tracks a first amount of time a first reference media asset has been stored in the reference database 112, a second amount of time a second reference media asset has been stored in the reference database 112, a third amount of time a third reference media asset has been stored in the reference database 112, etc. The example storage time determination circuitry 302 determines if the amounts of time that each of the reference media assets have been stored in the reference database 112 satisfy a first condition. In some examples, the first condition determines whether reference database management circuitry 114 should proceed to prune the reference media asset(s). In some examples, the first condition is a time threshold (e.g., three days, one week, one month, etc.).

The example storage time determination circuitry 302 determines the first condition is satisfied when a reference media asset has been stored in the database for at least the time threshold. In some examples, the storage time determination circuitry 302 determines the first condition is satisfied when the amount of time associated with one reference media asset satisfies (e.g., is equal to or greater than) the time threshold. In some examples, the storage time determination circuitry 302 determines the first condition is satisfied when amounts of time associated with each of the reference media assets in a group of reference media assets satisfy (e.g., is equal to or greater than) the time threshold. The example storage time determination circuitry 302 triggers the example exposure interface 304 to access the history of media exposure from the example media exposure crediting circuitry 208 first condition is satisfied.

The example exposure interface 304 selects reference media assets from the exposure data provided by the example media exposure crediting circuitry 208 included in the example meter data analysis circuitry 110 of FIG. 2. The example exposure interface 304 accesses the history of media exposure credited to the reference media assets from the example media exposure crediting circuitry 208. In some examples, the exposure interface 304 determine exposure frequencies for the reference media assets based on the history of media exposure credited to the reference media asset and the time period the reference media asset has been stored in the reference database 112. For example, the exposure interface 304 determines an exposure frequency for a given reference media asset to be how many times the reference media asset was credited for media exposure in the time period the reference media asset has been stored in the reference database 112.

The example threshold detection circuitry 306 compares the exposure frequencies determined by the example exposure interface 304 to a second condition for whether the reference media assets should be pruned. In some examples, the threshold detection circuitry 306 determines if the exposure frequencies for the reference media assets satisfy the second condition. In examples disclosed herein, the second condition is an exposure frequency threshold (e.g., 50 exposures in the time period, 100 exposures in the time period, 10,000 exposures in the time period, etc.). In some examples, the second condition can depend on the first condition (e.g., what the time threshold is set to) and how long the reference media asset was stored in the reference database 112. The example threshold detection circuitry 306 determines the second condition is satisfied when the exposure frequency of a reference media asset is less then, or does not exceed (e.g., is less than or equal to) the exposure frequency threshold. If the example threshold detection circuitry 306 determines the second condition is satisfied, then the threshold detection circuitry 306 triggers the example media segmentation circuitry 308 to prune the reference media assets. If the example threshold detection circuitry 306 determines the second condition is not satisfied, then the threshold detection circuitry 306 triggers the example reference media retriever circuitry 310 to determine if the reference media assets were segmented previously.

The example media segmentation circuitry 308 prunes the reference media assets when the first and second conditions are satisfied. The example media segmentation circuitry 308 determines the lengths of the reference media assets. In some examples, the media segmentation circuitry 308 determines the length as the total time of the reference media assets (e.g., for a 90 minute television program, the length of the reference media asset is 90 minutes). The example media segmentation circuitry 308 segments the lengths of the reference media assets into a plurality of segments. The example media segmentation circuitry 308 segments the reference media asset into discrete time segments. In some examples, the discrete time segments are periods of time (e.g., three minutes, five minutes, etc.). For example, the media segmentation circuitry 308 can divide the reference media asset into temporally adjacent time segments.

The example media segmentation circuitry 308 prunes the segments of the reference media asset. In some examples, the media segmentation circuitry 308 removes a first group of the segments and retains a second group of the segments in the reference database 112. For example, in a 90 minute television program that is being pruned, the television program can be divided into one minute segments, and a portion of the segments can be retained in the reference database 112 (e.g., 2-3 minute segment, 7-8 minute segment, 15-16 minute segment, 28-29 minute segment, 44-45 minute segment, etc.). The example media segmentation circuitry 308 retains some of the segments in the reference database 112 to compare with monitoring data (e.g., the monitoring data 104A, 104B, 104C) from the example media meters 102A, 102B, 102C to credit media exposure associated with the reference media asset even after pruning. The example media segmentation circuitry 308 keeps an identifiable amount of segments of the reference media assets, however, not all of the segments of the reference media asset, thereby saving storage space and maintaining performance in the matching process of the example meter data analysis circuitry 110 of FIGS. 1 and/or 2.

The example reference media retriever circuitry 310 determines if the reference media assets were segmented previously by the example media segmentation circuitry 308. In some examples, if the example threshold detection circuitry 306 determines that the exposure frequency for a reference media asset does not satisfy the exposure threshold (e.g., the exposure frequency of the reference media asset exceeded the threshold), the example reference media retriever circuitry 310 determines if the reference media asset was segmented/pruned previously (e.g., only a portion of the segments of the reference media asset are stored in the reference database 112). If the example reference media retriever circuitry 310 determines the reference media asset was segmented previously, the reference media retriever circuitry 310 retrieves a complete version of the reference media assets from the archived, complete version (e.g., including the segments previously removed from the reference media asset by the example media segmentation circuitry 308 during the pruning process) stored in the archive database 116.

The example database interface 312 stores the archived versions of the reference signatures, reference watermarks, and other reference data associated with the pruned reference media assets. In some examples, the database interface 312 provides the example media segmentation circuitry 308 and the example reference media retriever circuitry 310 with access to the archived, full versions of the pruned reference media assets and the associated data stored in the archive database 116 from the example reference database 112 before the pruning process of the example media segmentation circuitry 308. In some examples, the database interface 312 stores the updated reference media assets not pruned by the example media segmentation circuitry 308 in the example reference database 112. In some examples, the database interface 312 stores the complete versions of the reference media assets in the example reference database 112 from the archived, complete versions stored in the archive database 116 that were retrieved by the example reference media retriever circuitry 310.

In some examples, the meter data analysis circuitry 110 includes means for collecting monitoring data. For example, the means for collecting may be implemented by data access circuitry 202. In some examples, the data access circuitry 202 may be implemented by machine executable instructions such as that implemented by at least blocks 402, 404 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the data access circuitry 202 is implemented by other hardware logic circuitry, hardware implemented state machines, and/or any other combination of hardware, software, and/or firmware. For example, the data access circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the meter data analysis circuitry 110 includes means for matching signatures. For example, the means for matching may be implemented by signature matching circuitry 204. In some examples, the signature matching circuitry 204 may be implemented by machine executable instructions such as that implemented by at least blocks 406, 408 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the signature matching circuitry 204 is implemented by other hardware logic circuitry, hardware implemented state machines, and/or any other combination of hardware, software, and/or firmware. For example, the signature matching circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the meter data analysis circuitry 110 includes means for crediting media exposure of reference media assets. For example, the means for crediting may be implemented by media exposure crediting circuitry 208. In some examples, the media exposure crediting circuitry 208 may be implemented by machine executable instructions such as that implemented by at least block 410 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the media exposure crediting circuitry 208 is implemented by other hardware logic circuitry, hardware implemented state machines, and/or any other combination of hardware, software, and/or firmware. For example, the media exposure crediting circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the reference database management circuitry 114 includes means for determining a first condition to prune a reference media asset is satisfied. For example, the means for determining may be implemented by storage time determination circuitry 302. In some examples, the storage time determination circuitry 302 may be implemented by machine executable instructions such as that implemented by at least block 502 of FIG. 5 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the storage time determination circuitry 302 is implemented by other hardware logic circuitry, hardware implemented state machines, and/or any other combination of hardware, software, and/or firmware. For example, the storage time determination circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the reference database management circuitry 114 includes means for accessing a history of media exposure data. For example, the means for accessing may be implemented by exposure interface 304. In some examples, the exposure interface 304 may be implemented by machine executable instructions such as that implemented by at least blocks 504, 506, 508 of FIG. 5 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the exposure interface 304 is implemented by other hardware logic circuitry, hardware implemented state machines, and/or any other combination of hardware, software, and/or firmware. For example, the exposure interface 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the reference database management circuitry 114 includes means for determining a second condition to prune a reference media asset is satisfied. For example, the means for determining may be implemented by threshold detection circuitry 306. In some examples, the threshold detection circuitry 306 may be implemented by machine executable instructions such as that implemented by at least blocks 510 of FIG. 5 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the threshold detection circuitry 306 is implemented by other hardware logic circuitry, hardware implemented state machines, and/or any other combination of hardware, software, and/or firmware. For example, the threshold detection circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the reference database management circuitry 114 includes means for segmenting a reference media asset. For example, the means for segmenting may be implemented by media segmentation circuitry 308. In some examples, the media segmentation circuitry 308 may be implemented by machine executable instructions such as that implemented by at least blocks 512 of FIG. 5 and blocks 602, 604, 606, 606 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the media segmentation circuitry 308 is implemented by other hardware logic circuitry, hardware implemented state machines, and/or any other combination of hardware, software, and/or firmware. For example, the media segmentation circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the reference database management circuitry 114 includes means for retrieving reference media asset archives. For example, the means for retrieving may be implemented by reference media retriever circuitry 310. In some examples, the reference media retriever circuitry 310 may be implemented by machine executable instructions such as that implemented by at least blocks 514, 516 of FIG. 5 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the reference media retriever circuitry 310 is implemented by other hardware logic circuitry, hardware implemented state machines, and/or any other combination of hardware, software, and/or firmware. For example, the reference media retriever circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the meter data analysis circuitry 110 and the reference database management circuitry 114 of FIG. 1 is illustrated in FIGS. 2 and 3, one or more of the elements, processes, and/or devices illustrated in FIGS. 2 and 3 may be combined, divided, re-arranged, omitted, eliminated, and/or implemented in any other way. Further, the example data access circuitry 202, the example signature matching circuitry 204, the example reference database interface 206, the example media exposure crediting circuitry 208, the example storage time determination circuitry 302, the example exposure interface 304, the example threshold detection circuitry 306, the example media segmentation circuitry 308, the example reference media retriever circuitry 310, the example database interface 312, and/or, more generally, the example meter data analysis circuitry 110 and the example reference database management circuitry 114 of FIG. 1, may be implemented by hardware, software, firmware, and/or any combination of hardware, software, and/or firmware. Thus, for example, any of the example data access circuitry 202, the example signature matching circuitry 204, the example reference database interface 206, the example media exposure crediting circuitry 208, the example storage time determination circuitry 302, the example exposure interface 304, the example threshold detection circuitry 306, the example media segmentation circuitry 308, the example reference media retriever circuitry 310, the example database interface 312, and/or, more generally, the example meter data analysis circuitry 110 and the example reference database management circuitry 114, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example data access circuitry 202, the example signature matching circuitry 204, the example reference database interface 206, the example media exposure crediting circuitry 208, the example storage time determination circuitry 302, the example exposure interface 304, the example threshold detection circuitry 306, the example media segmentation circuitry 308, the example reference media retriever circuitry 310, and/or the example database interface 312 is/are hereby expressly defined to include a non-transitory computer readable storage device or storage disk such as a memory, a digital versatile disk (DVD), a compact disk (CD), a Blu-ray disk, etc., including the software and/or firmware. Further still, the example meter data analysis circuitry 110 and the example reference database management circuitry 114 of FIG. 1 may include one or more elements, processes, and/or devices in addition to, or instead of, those illustrated in FIGS. 2 and 3, and/or may include more than one of any or all of the illustrated elements, processes and devices.

Figure 4:
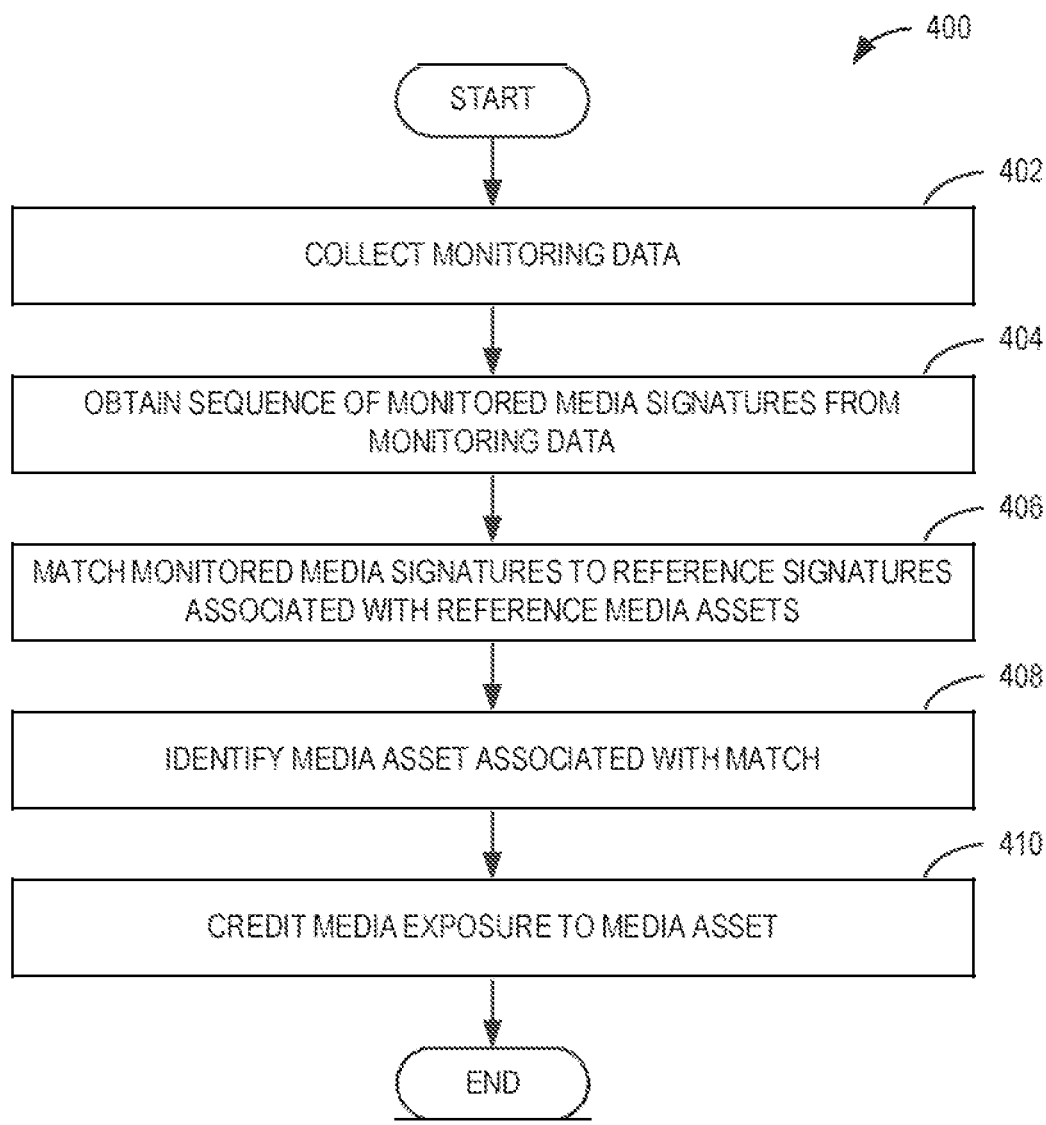
FIG. 4 is a flowchart representative of example machine readable instructions that may be executed by example processor circuitry to implement the example meter data analysis circuitry of FIGS. 1 and/or 2.
Figure 5:
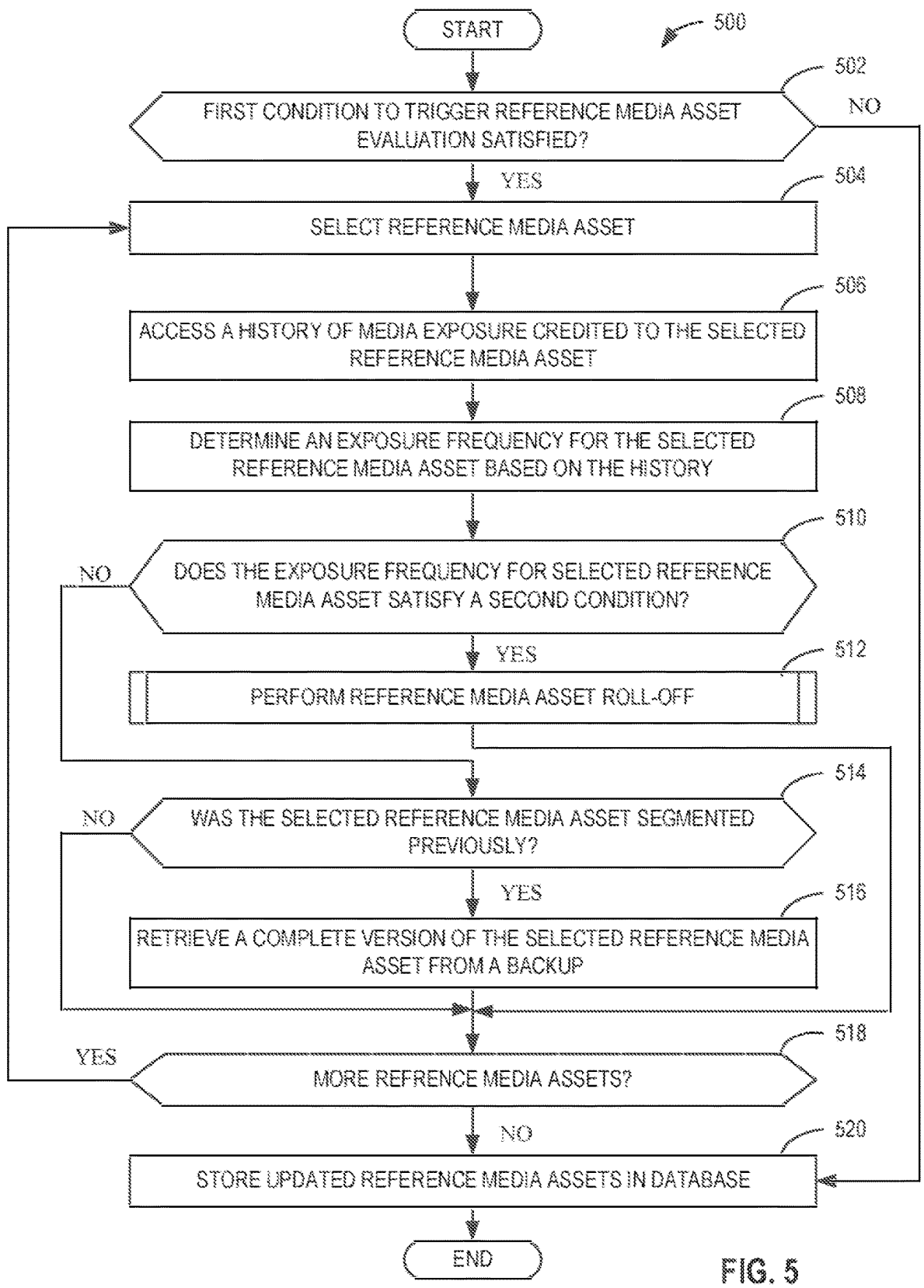
FIG. 5 is a flowchart representative of example machine readable instructions that may be executed by example processor circuitry to implement the example reference database management circuitry of FIGS. 1 and/or 3.
Figure 6:
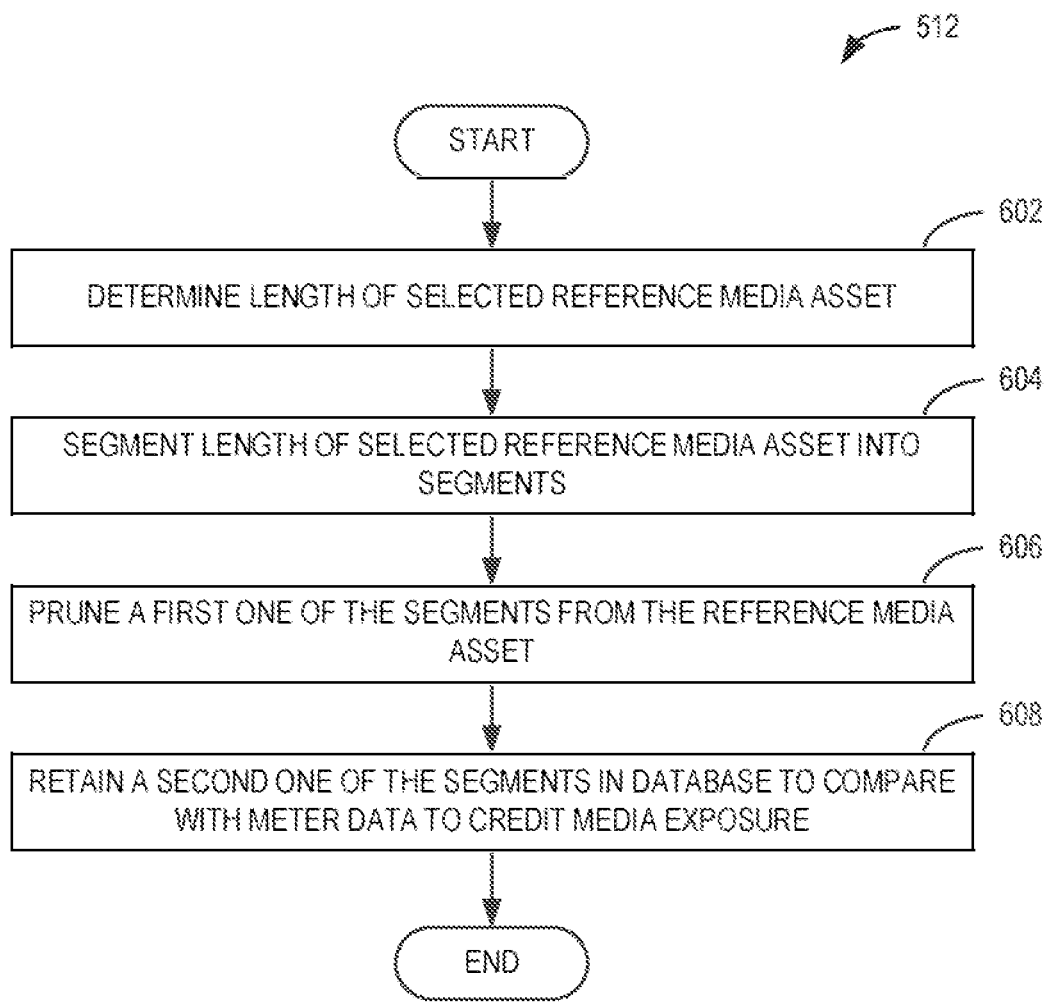
FIG. 6 is a flowchart representative of example machine readable instructions that may be executed by example processor circuitry to implement example media segmentation circuitry included in the example reference database management circuitry of FIGS. 1 and/or 3.

Flowcharts representative of example hardware logic circuitry, machine readable instructions, hardware implemented state machines, and/or any combination thereof for implementing the meter data analysis circuitry 110 and the example reference database management circuitry 114 of FIG. 1 are shown in FIGS. 4, 5, and 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 4, 5, and 6. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4, 5, and 6, many other methods of implementing the example meter data analysis circuitry 110 and the example reference database management circuitry 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4, 5, and 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B. (5) A with C. (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A. (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A. (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to implement the example meter data analysis circuitry 110 of FIGS. 1 and/or 2. The machine readable instructions and/or operations 400 of FIG. 4 begin at block 402, at which the example data access circuitry 202 collects monitoring data from media meters. The example data access circuitry 202 collects the monitoring data such as the monitoring data 104A, 104B, 104C of FIG. 1, from the media meters, such as the meters 102A, 102B, 102C of FIG. 1, via the example network 106. In some examples, the data access circuitry 202 can convert the monitoring data 104A, 104B, 104C into a format readable by the meter data analysis circuitry 110. In some examples, the data access circuitry 202 can be in continuous communication with the network 106, the first media meter 102A, the second media meter 102B and/or the third media meter 102C. In other examples, the data access circuitry 202 can be in intermittent (e.g., periodic or aperiodic) communication with the network 106, the first media meter 102A, the second media meter 102B and/or the third media meter 102C. The remainder of the process 400 of FIG. 4 is described with reference to the monitoring data 104A. However, the process 400 is also applicable to any other monitoring data described in this disclosure (e.g., the monitoring data 104B, 104C, etc.). At block 404, the example data access circuitry 202 obtains the sequence of monitored media signatures from the monitoring data 104A.

At block 406, the example signature matching circuitry 204 matches the monitored media signatures to reference signatures associated with the reference media assets. The example signature matching circuitry 204 compares the monitored media signatures in the example monitoring data 104A to the reference signatures in the example reference database 112 of FIG. 1 to identify media assets associated with monitoring data 104A. For example, the signature matching circuitry 204 can determine if the monitored media signatures of the monitoring data 104A match any reference signatures stored in the reference database 112. In some examples, some or all of the monitored media signatures of the monitoring data 104A can match with corresponding reference signatures in the reference database 112 that represent a reference media asset (e.g., reference signatures associated with a television episode, etc.). In some examples disclosed herein, the signature matching circuitry 204 may perform matching using any suitable means (e.g., linear matching, hashed matching, etc.). At block 408, the example signature matching circuitry 204 identifies the media asset associated with the match. The example signature matching circuitry 204 identifies the reference media assets associated with the matches between the monitored media signatures of the monitoring data 104A and the reference signatures in the reference database 112.

At block 410, the example media exposure crediting circuitry 208 credits the media exposure to the media asset. The example media exposure crediting circuitry 208 uses identification data associated with the reference media asset identified by the signature matching circuitry 204 to credit the media exposure of the reference media asset to user(s) associated with the media meter 102A. In some examples, the identification data includes associations between the media monitoring data and particular reference media assets. In some examples, the media exposure crediting circuitry 208 credits the media exposure to the reference media asset associated with reference data (e.g., reference signature, reference watermarks, etc.) determined to match the monitoring data 104A (e.g., monitored media signatures, etc.). After block 410 completes, process 400 ends.

FIG. 5 is a flowchart representative of example machine readable instructions and/or example operations 500 that may be executed and/or instantiated by processor circuitry to implement the example reference database management circuitry 114 of FIGS. 1 and/or 3. The machine readable instructions and/or operations 500 of FIG. 5 begin at block 502, at which the example storage time determination circuitry 302 determines if the first condition to trigger reference media asset evaluation is satisfied. The example storage time determination circuitry 302 determines and tracks the amounts of time each of the reference media assets have been stored in the reference database 112. For example, the storage time determination circuitry 302 tracks a first amount of time a first reference media asset has been stored in the reference database 112, a second amount of time a second reference media asset has been stored in the reference database 112, a third amount of time a third reference media asset has been stored in the reference database 112, etc. The example storage time determination circuitry 302 determines if the amounts of time of each of the reference media assets have been stored in the reference database 112 satisfy a first condition. In some examples, the first condition determines whether reference database management circuitry 114 should proceed to prune the reference media assets. In some examples, the first condition is a time threshold (e.g., three days, one week, one month, etc.). The example storage time determination circuitry 302 determines the first condition to trigger reference media asset evaluation is satisfied when a reference media asset has been stored in the database for at least the time threshold. For example, the example storage time determination circuitry 302 triggers the performance of reference media asset evaluation when the amount of time satisfies (e.g., is equal to or greater than) the first condition (e.g., the time threshold). In some examples, the storage time determination circuitry 302 determines the first condition is satisfied when a reference media asset has been stored in the database for at least the time threshold. In some examples, the storage time determination circuitry 302 determines the first condition is satisfied when the amount of time associated with one reference media asset satisfies (e.g., is equal to or greater than) the time threshold. In some examples, the storage time determination circuitry 302 determines the first condition is satisfied when amounts of time associated with each of the reference media assets in a group of reference media assets satisfy (e.g., is equal to or greater than) the time threshold.

If the example storage time determination circuitry 302 determines the first condition to trigger reference media asset evaluation is not satisfied, then process 500 continues to block 520 at which the example database interface 312 stores updated reference media assets in the reference database 112. If the example storage time determination circuitry 302 determines the first condition to trigger reference media asset evaluation is satisfied, then process 500 continues to block 504 at which the example exposure interface 304 selects a reference media asset. The example exposure interface 304 selects a reference media asset from the exposure data provided by the example media exposure crediting circuitry 208 included in the example meter data analysis circuitry 110 of FIG. 2.

At block 506, the example exposure interface 304 accesses a history of media exposure credited to the selected reference media asset from the example media exposure crediting circuitry 208. In some examples, the example exposure interface 304 access the exposure crediting history for a period of time (e.g., in the last few days, in the last few weeks, etc.). At block 508, the example exposure interface 304 determines an exposure frequency for the selected reference media asset based on the history. In some examples, the exposure interface 304 determines an exposure frequency for the selected reference media asset based on the history of media exposure credited to the selected reference media asset and the time period the selected reference media asset has been stored in the reference database 112. For example, the exposure interface 304 determines the exposure frequency as how many times the selected reference media asset was credited for media exposure in the time period the selected reference media asset has been stored in the reference database 112.

At block 510, the example threshold detection circuitry 306 determines if the exposure frequency for the selected reference media asset satisfies a second condition. The example threshold detection circuitry 306 compares the exposure frequency determined by the example exposure interface 304 to a second condition for whether the selected reference media asset should be pruned. In some examples, the threshold detection circuitry 306 determines if the exposure frequency for the selected reference media assets satisfies the second condition. In examples disclosed herein, the second condition is an exposure frequency threshold (e.g., 50 exposures in the time period, 100 exposures in the time period, 10,000 exposures in the time period, etc.). In some examples, the second condition can depend on the first condition (e.g., what the time threshold is set to) and how long the selected reference media asset was stored in the reference database 112. The example threshold detection circuitry 306 determines the second condition is satisfied when the exposure frequency of the selected reference media asset does not exceed the exposure frequency threshold.

If the example threshold detection circuitry 306 determines the exposure frequency for the selected reference media asset does satisfy the second condition, then process 500 continues to block 512 at which the example media segmentation circuitry 308 performs reference media asset roll-off In some examples, the example media segmentation circuitry 308 prunes the selected reference media asset when the second condition is satisfied. As described in further detail below, the example flowchart 512 of FIG. 6 represents example instructions that may be implemented to perform reference media asset roll-off If the example threshold detection circuitry 306 determines the exposure frequency for the selected reference media asset does not satisfy the second condition, then process 500 continues to block 514 at which the example reference media retriever circuitry 310 determines if the selected reference media asset was segmented previously.

At block 514, the example reference media retriever circuitry 310 determines if the selected reference media asset was segmented previously. In some examples, if the example threshold detection circuitry 306 determines that the exposure frequency for the selected reference media asset does not satisfy the exposure threshold (e.g., the exposure frequency of the selected reference media asset exceeds the threshold), the example reference media retriever circuitry 310 determines if the selected reference media asset was segmented/pruned previously (e.g., only a portion of the segments of the reference media asset are stored in the reference database 112).

If the example reference media retriever circuitry 310 determines the selected reference media asset was segmented previously, then process 500 continues to block 516 at which the example reference media retriever circuitry 310 retrieves a complete version of the selected reference media asset from an archive. The example reference media retriever circuitry 310 retrieves a complete version of the selected reference media asset from the archived, complete version (e.g., including the segments previously removed from the reference media asset by the example media segmentation circuitry 308 during the pruning process) stored in the archive database 116. The example database interface 312 stores the archived versions of the reference signatures, reference watermarks, and other reference data associated with the pruned reference media assets. In some examples, the database interface 312 provides the example media segmentation circuitry 308 and the example reference media retriever circuitry 310 with access to the archived, full versions of the pruned reference media assets and the associated data stored in the archive database 116 from the example reference database 112 before the pruning process of the example media segmentation circuitry 308.

If the example reference media retriever circuitry 310 determines the selected reference media asset was not segmented previously, then process 500 continues to block 518 at which the example exposure interface 304 determines if there are more reference media assets. If the example exposure interface 304 determines there are more reference media assets, then process 500 returns to block 504 at which the example exposure interface 304 selects a reference media asset. If the example exposure interface 304 determines there are not anymore reference media assets, then process 500 continues to block 520 at which the example database interface 312 stores updated reference media assets in the reference database 112. In some examples, the database interface 312 stores the updated reference media assets not pruned by the example media segmentation circuitry 308 in the example reference database 112. In some examples, the database interface 312 stores the complete versions of the reference media assets in the example reference database 112 from the archived, complete versions stored in the archive database 116 that were retrieved by the example reference media retriever circuitry 310. After block 520, process 500 ends.

FIG. 6 is a flowchart representative of example machine readable instructions and/or example operations 512 that may be executed and/or instantiated by processor circuitry to implement the example media segmentation circuitry 308 included in the example reference database management circuitry 114 of FIGS. 1 and/or 3. The machine readable instructions and/or operations 512 of FIG. 6 begin at block 602, at which the example media segmentation circuitry 308 determines the length of the selected reference media asset. In some examples, the media segmentation circuitry 308 determines the length as the total time (e.g., total duration) of the selected reference media asset (e.g., for a 90 minute television program, the length of the reference media asset is 90 minutes).

At block 604, the example media segmentation circuitry 308 segments the length of the selected reference media asset into segments. The example media segmentation circuitry 308 segments the length of the selected reference media asset into a plurality of segments. The example media segmentation circuitry 308 segments the selected reference media asset into discrete time segments. In some examples, the discrete time segments are periods of time (e.g., three minutes, five minutes, etc.). For example, the media segmentation circuitry 308 can divide the selected reference media asset into temporally adjacent time segments.

At block 606, the example media segmentation circuitry 308 prunes the first ones of the segments from the reference media asset. At block 608, the example media segmentation circuitry 308 retains second ones of the segments in the database to compare with meter data to credit media exposure. In some examples, the media segmentation circuitry 308 removes a first group of one or more of the segments and retains a second group of one or more of the segments of the selected reference media asset in the reference database 112. For example, in a 90 minute television program that is being pruned, the television program can be divided into one minute segments, and one group of the segments can be retained in the reference database 112 (e.g., 2-3 minute segment, 7-8 minute segment, 15-16 minute segment, 28-29 minute segment, 44-45 minute segment, etc.), whereas the group of remaining segments can be archived in the archive database 116. The example media segmentation circuitry 308 retains some of the segments in the reference database 112 to compare with monitoring data (e.g., the monitoring data 104A, 104B, 104C) from the example media meters 102A, 102B, 102C to credit media exposure associated with the reference media asset even after pruning. The example media segmentation circuitry 308 keeps an identifiable amount of segments of the reference media assets in the reference database 112, however, not all of the segments of the reference media asset, thereby saving storage space and maintaining performance in the matching process of the example meter data analysis circuitry 110 of FIGS. 1 and/or 2. After block 608, process 512 completes and returns to process 500 of FIG. 5.

Figure 7:
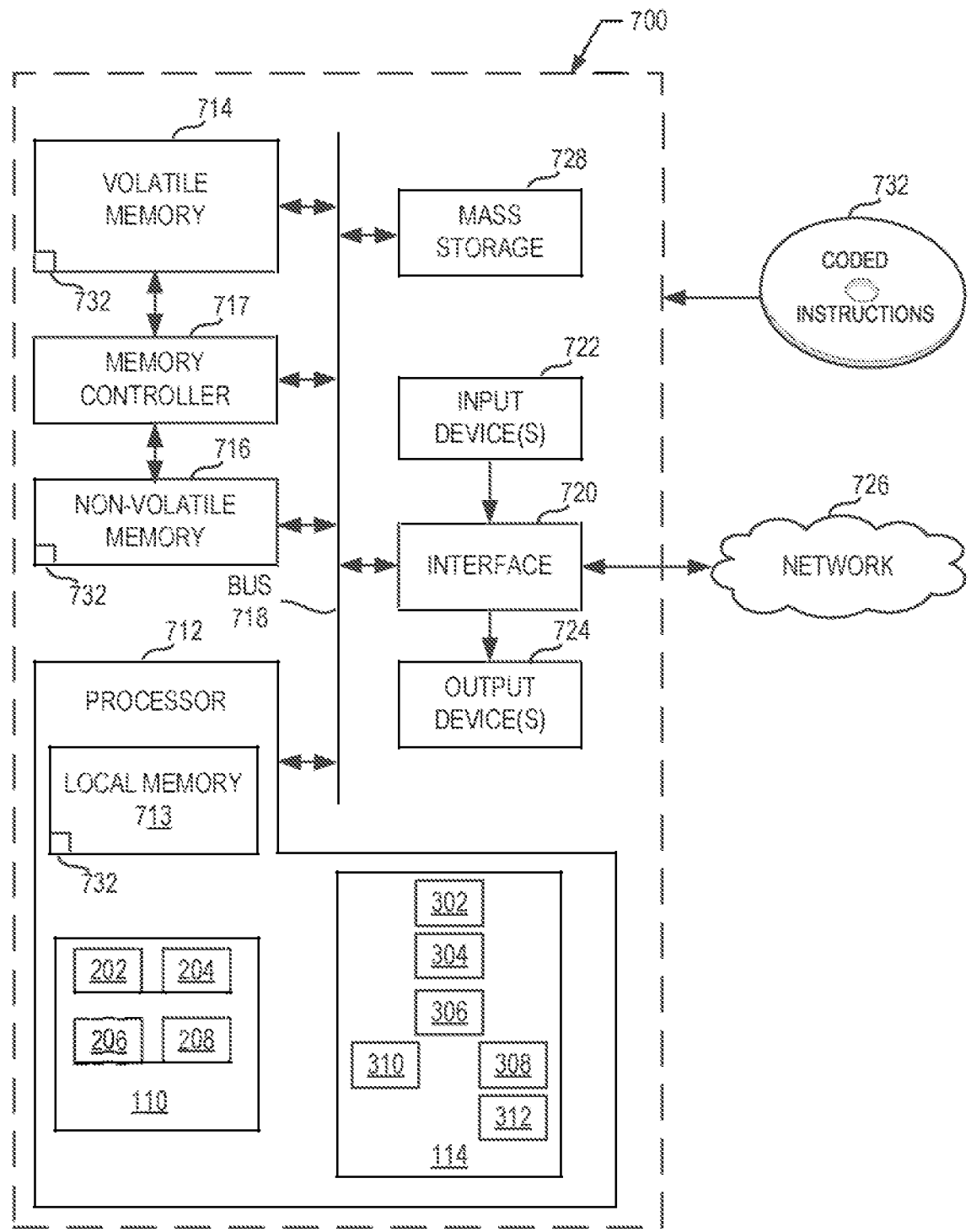
FIG. 7 is a block diagram of an example processing platform including processor circuitry structured to execute the example machine readable instructions of FIGS. 4, 5, and 6 to implement the meter data analysis circuitry of FIGS. 1 and/or 2 and the reference database management circuitry of FIGS. 1 and/or 3.

FIG. 7 is a block diagram of an example processor platform 700 structured to execute and/or instantiate the machine readable instructions and/or operations of FIGS. 4, 5, and 6 to implement the example meter data analysis circuitry 110 and the example reference database management circuitry 114 of FIGS. 1, 2, and/or 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example meter data analysis circuitry 110, the example reference database management circuitry 114, the example data access circuitry 202, the example signature matching circuitry 204, the example reference database interface 206, the example media exposure crediting circuitry 208, the example storage time determination circuitry 302, the example exposure interface 304, the example threshold detection circuitry 306, the example media segmentation circuitry 308, the example reference media retriever circuitry 310, and the example database interface 312.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDS, Blu-ray disk drives, redundant array of independent disks (RAID) systems, solid state storage devices such as flash memory devices, and DVD drives.

The machine executable instructions 732, which may be implemented by the machine readable instructions of FIGS. 4, 5, and 6, may be stored in the mass storage device 728, in the volatile memory 714, in the non-volatile memory 716, and/or on a removable non-transitory computer readable storage medium such as a CD or DVD.

Figure 8:
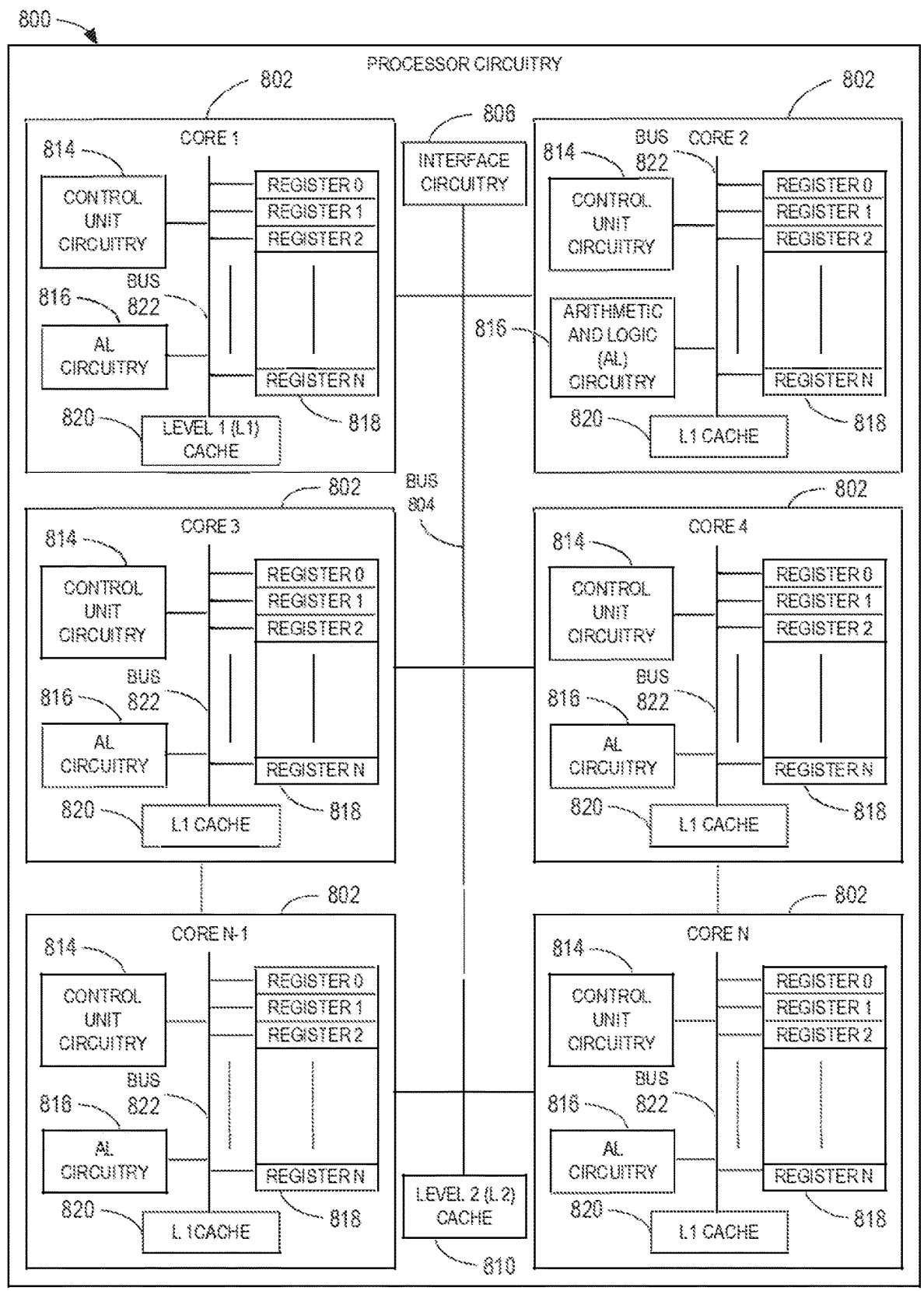
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 4, 5, and 6.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 820 may implement at least one of an I2C bus, a SPI bus, a PCI bus, or a PCie bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
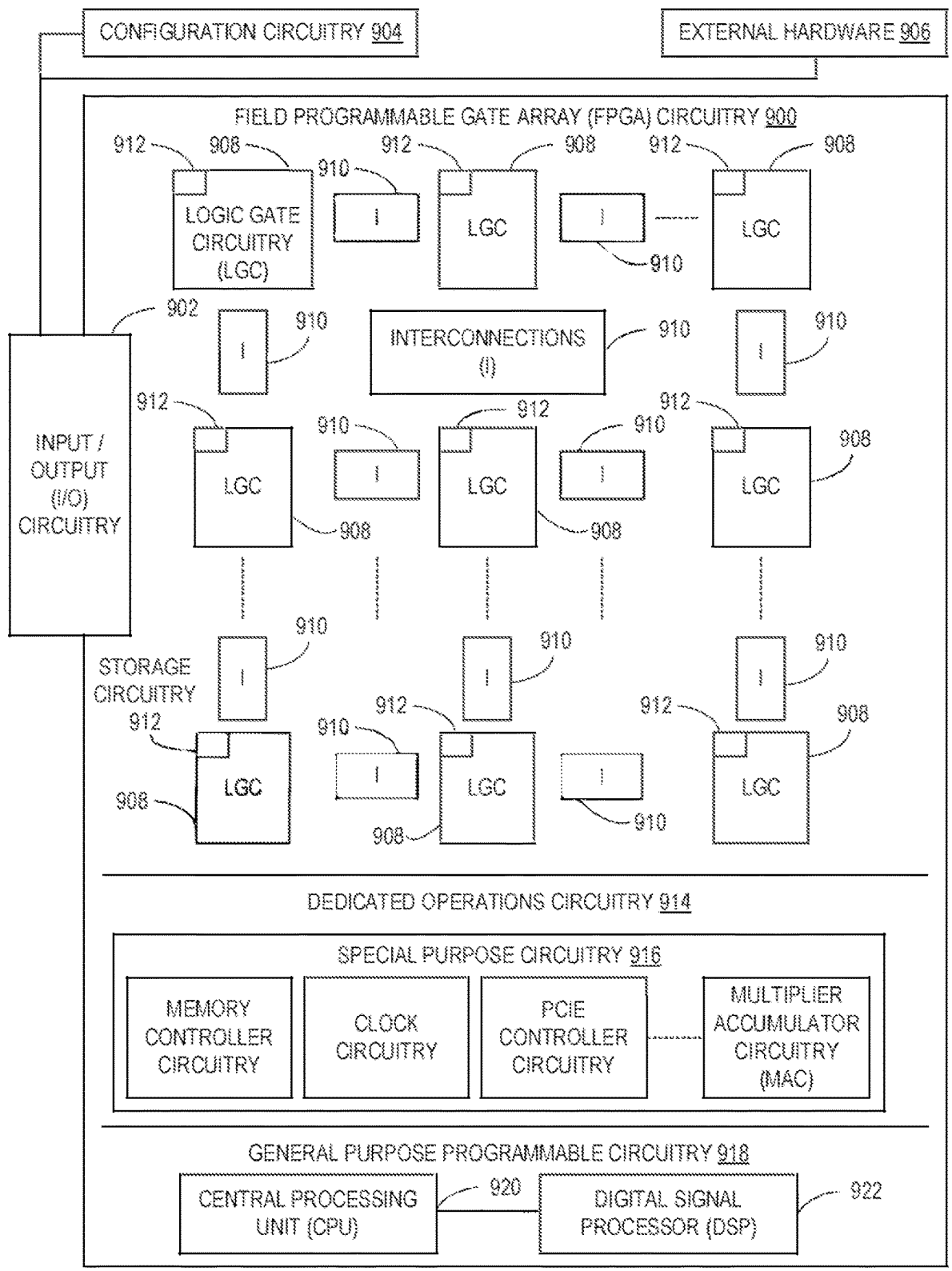
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 4, 5, and 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 4, 5, and 6. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 4, 5, and 6. As such, the FPGA circuitry 900 may be structured to effectively instantiate some or all of the machine readable instructions of the flowcharts of FIGS. 4, 5, and 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 4, 5, and 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 4, 5, and 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCie controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 4, 5, and 6 may be executed by one or more of the cores 802 of FIG. 8 and a second portion of the machine readable instructions represented by the flowcharts of FIGS. 4, 5, and 6 may be executed by the FPGA circuitry 900 of FIG. 9.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
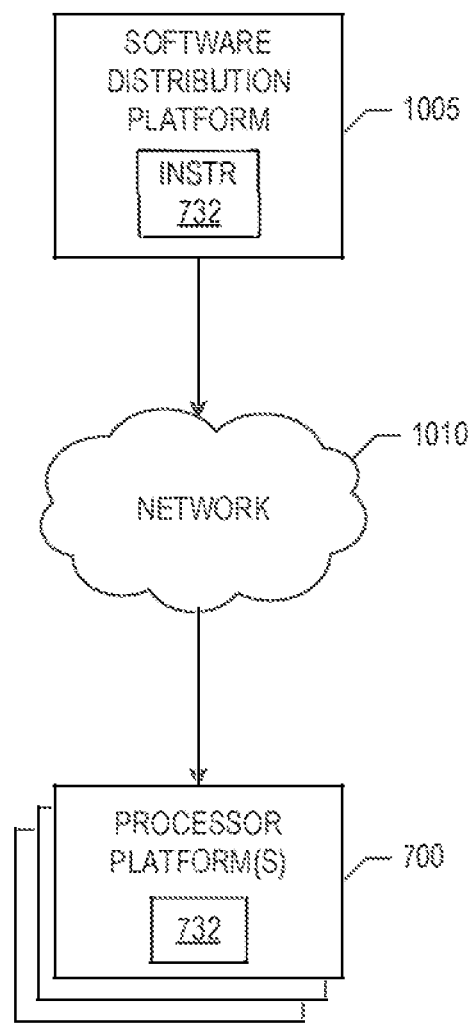
FIG. 10 is a block diagram of an example software distribution platform (e.g., one or more servers) to distribute software (e.g., software corresponding to the example machine readable instructions of FIGS. 4, 5, and 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 400, 500, and 512 of FIGS. 4-6, as described above. The one or more servers of the example software distribution platform 1005 are in communication with a network 1010, which may correspond to any one or more of the Internet and/or any of the example network 726 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 400, 500, and 512 of FIGS. 4-6, may be downloaded to the example processor platform 700, which is to execute the machine readable instructions 732 to implement the meter data analysis circuitry 110 and the example reference database management circuitry 114 of FIGS. 1, 2, and/or 3. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example methods, apparatus and articles of manufacture have been disclosed that allow for optimization of reference signature matching. The disclosed methods, apparatus and articles of manufacture improve the efficiency of using a computing device by reducing computational and storage requirements of systems that identify media exposure. The disclosed examples remove reference media assets from the reference database based on conditions that help to reduce to total number of reference media assets without causing a loss of crediting. The disclosed herein examples look at the history of exposure for the reference media assets during a period of time and divide the reference media assets into segments where some of the segments are kept while the rest are removed from the reference database. The disclosed examples save storage space and maintain performance in the media matching process by keeping an identifiable amount of the reference media assets, however, not the entire reference media asset, in the reference database. The disclosed methods, apparatus and articles of manufacture are accordingly directed to one or more improvement(s) in the functioning of a computer.

Example methods, apparatus, systems, and articles of manufacture to for loading and roll-off of reference media assets are disclosed herein. Further examples and combinations thereof include the following:

Example I includes an apparatus comprising at least one memory, instructions in the apparatus, and processor circuitry to execute the instructions to determine whether a first condition to prune a reference media asset is satisfied, in response to a determination that the first condition is satisfied, determine whether a second condition to prune the reference media asset is satisfied, and in response to a determination that the second condition is satisfied segment the reference media asset into a plurality of segments based on a length of the reference media asset, prune a first one of the segments, and retain a second one of the segments in a database to compare with meter data to credit media exposure associated with the reference media asset.

Example 2 includes the apparatus of example 1, wherein the first condition is satisfied when the reference media asset has been stored in the database for at least a time threshold.

Example 3 includes the apparatus of example 1, wherein the processor circuitry is to access a history of media exposure credited to the reference media asset, the history associated with a first time period, and determine, based on the history, an exposure frequency for the reference media asset in the first time period.

Example 4 includes the apparatus of example 3, wherein the second condition is satisfied when the exposure frequency does not exceed a frequency threshold.

Example 5 includes the apparatus of example 4, wherein the history is a first history, the exposure frequency is a first exposure frequency, and the processor circuitry is to access a second history of media exposure credited to the reference media asset, the second history associated with a second time period, determine, based on the second history, a second exposure frequency for the reference media asset in the second time period, and determine that the second exposure frequency satisfies the frequency threshold.

Example 6 includes the apparatus of example 1, wherein the processor circuitry is to in response to a determination that the second condition is not satisfied, determine whether the reference media asset was segmented previously, and in response to a determination that the reference media asset was segmented previously, retrieve a complete version of the reference media asset from an archive, the complete version of the reference media asset including the first one of the segments previously pruned from the reference media asset.

Example 7 includes the apparatus of example 1, wherein the meter data is obtained from a meter that is to monitor media presented by a media device.

Example 8 includes At least one non-transitory computer readable medium comprising instructions which, when executed, cause one or more processors to at least determine whether a first condition to prune a reference media asset is satisfied, in response to a determination that the first condition is satisfied, determine whether a second condition to prune the reference media asset is satisfied, and in response to a determination that the second condition is satisfied segment the reference media asset into a plurality of segments based on a length of the reference media asset, prune a first one of the segments, and retain a second one of the segments in a database to compare with meter data to credit media exposure associated with the reference media asset.

Example 9 includes the at least one non-transitory computer readable medium of example 8, wherein the first condition is satisfied when the reference media asset has been stored in the database for at least a time threshold.

Example 10 includes the at least one non-transitory computer readable medium of example 8, wherein the instructions cause the one or more processors to access a history of media exposure credited to the reference media asset, the history associated with a first time period, and determine, based on the history, an exposure frequency for the reference media asset in the first time period.

Example 11 includes the at least one non-transitory computer readable medium of example 10, wherein the second condition is satisfied when the exposure frequency does not exceed a frequency threshold.

Example 12 includes the at least one non-transitory computer readable medium of example 11, wherein the history is a first history, the exposure frequency is a first exposure frequency, and the instructions cause the one or more processors to access a second history of media exposure credited to the reference media asset, the second history associated with a second time period, determine, based on the second history, a second exposure frequency for the reference media asset in the second time period, and determine that the second exposure frequency satisfies the frequency threshold.

Example 13 includes the at least one non-transitory computer readable medium of example 8, wherein the instructions cause the one or more processors to in response to a determination that the second condition is not satisfied, determine whether the reference media asset was segmented previously, and in response to a determination that the reference media asset was segmented previously, retrieve a complete version of the reference media asset from an archive, the complete version of the reference media asset including the first one of the segments previously pruned from the reference media asset.

Example 14 includes the at least one non-transitory computer readable medium of example 8, wherein the meter data is obtained from a meter that is to monitor media presented by a media device.

Example 15 includes a method comprising determining, by executing an instruction with at least one processor, whether a first condition to prune a reference media asset is satisfied, in response to a determination that the first condition is satisfied, determining, by executing an instruction with the at least one processor, whether a second condition to prune the reference media asset is satisfied, and in response to a determination that the second condition is satisfied segmenting, by executing an instruction with the at least one processor, the reference media asset into a plurality of segments based on a length of the reference media asset, pruning, by executing an instruction with the at least one processor, a first one of the segments, and retaining, by executing an instruction with the at least one processor, a second one of the segments in a database to compare with meter data to credit media exposure associated with the reference media asset.

Example 16 includes the method of example 15, wherein the first condition is satisfied when the reference media asset has been stored in the database for at least a time threshold.

Example 17 includes the method of example 15, further including accessing a history of media exposure credited to the reference media asset, the history associated with a first time period, and determining, based on the history, an exposure frequency for the reference media asset in the first time period.

Example 18 includes the method of example 17, wherein the second condition is satisfied when the exposure frequency does not exceed a frequency threshold.

Example 19 includes the method of example 18, wherein the history is a first history, the exposure frequency is a first exposure frequency, and further including accessing a second history of media exposure credited to the reference media asset, the second history associated with a second time period, determining, based on the second history, a second exposure frequency for the reference media asset in the second time period, and determining that the second exposure frequency satisfies the frequency threshold.

Example 20 includes the method of example 15, further including in response to a determination that the second condition is not satisfied, determining whether the reference media asset was segmented previously, and in response to a determination that the reference media asset was segmented previously, retrieving a complete version of the reference media asset from an archive, the complete version of the reference media asset including the first one of the segments previously pruned from the reference media asset.

Example 21 includes the method of example 15, wherein the meter data is obtained from a meter that is to monitor media presented by a media device.

Example 22 includes an apparatus comprising media exposure crediting circuitry to determine whether a first condition to prune a reference media asset is satisfied, threshold detection circuitry to, in response to a determination that the first condition is satisfied, determine whether a second condition to prune the reference media asset is satisfied, and media segmentation circuitry to, in response to a determination that the second condition is satisfied segment the reference media asset into a plurality of segments based on a length of the reference media asset, prune a first one of the segments, and retain a second one of the segments in a database to compare with meter data to credit media exposure associated with the reference media asset.

Example 23 includes the apparatus of example 22, wherein the first condition is satisfied when the reference media asset has been stored in the database for at least a time threshold.

Example 24 includes the apparatus of example 22, further including an exposure interface to access a history of media exposure credited to the reference media asset, the history associated with a first time period, and determine, based on the history, an exposure frequency for the reference media asset in the first time period.

Example 25 includes the apparatus of example 24, wherein the second condition is satisfied when the exposure frequency does not exceed a frequency threshold.

Example 26 includes the apparatus of example 25, wherein the history is a first history, the exposure frequency is a first exposure frequency, and the exposure interface is to access a second history of media exposure credited to the reference media asset, the second history associated with a second time period, and determine, based on the second history, a second exposure frequency for the reference media asset in the second time period.

Example 27 includes the apparatus of example 26, wherein the threshold detection circuitry is to determine that the second exposure frequency satisfies the frequency threshold.

Example 28 includes the apparatus of example 22, further including reference media retriever circuitry to in response to a determination that the second condition is not satisfied, determine whether the reference media asset was segmented previously, and in response to a determination that the reference media asset was segmented previously, retrieve a complete version of the reference media asset from an archive, the complete version of the reference media asset including the first one of the segments previously pruned from the reference media asset.

Example 29 includes the apparatus of example 22, wherein the meter data is obtained from a meter that is to monitor media presented by a media device.

Example 30 includes an apparatus comprising first means for determining whether a first condition to prune a reference media asset is satisfied, second means for determining whether a second condition to prune the reference media asset is satisfied, the second means to determine whether the second condition is satisfied responsive to a determination that the first condition is satisfied, and means for segmenting the reference media asset into a plurality of segments in response to a determination that the second condition is satisfied, the means for segmenting to segment the reference media asset into a plurality of segments based on a length of the reference media asset, prune a first one of the segments, and retain a second one of the segments in a database to compare with meter data to credit media exposure associated with the reference media asset.

Example 31 includes the apparatus of example 30, wherein the first condition is satisfied when the reference media asset has been stored in the database for at least a time threshold.

Example 32 includes the apparatus of example 30, further including means for accessing a history of media exposure credited to the reference media asset, the means for accessing to access the history of media exposure credited to the reference media asset, the history associated with a first time period, and determine, based on the history, an exposure frequency for the reference media asset in the first time period.

Example 33 includes the apparatus of example 32, wherein the second condition is satisfied when the exposure frequency does not exceed a frequency threshold.

Example 34 includes the apparatus of example 33, wherein the history is a first history, the exposure frequency is a first exposure frequency, and the means for accessing is to access a second history of media exposure credited to the reference media asset, the second history associated with a second time period, and determine, based on the second history, a second exposure frequency for the reference media asset in the second time period.

Example 35 includes the apparatus of example 34, wherein the second means is to determine that the second exposure frequency satisfies the frequency threshold.

Example 36 includes the apparatus of example 30, further including means for retrieving a complete version of the reference media asset, the means for retrieving to in response to a determination that the second condition is not satisfied, determine whether the reference media asset was segmented previously, and in response to a determination that the reference media asset was segmented previously, retrieve the complete version of the reference media asset from an archive, the complete version of the reference media asset including the first one of the segments previously pruned from the reference media asset.

Example 37 includes the apparatus of example 30, wherein the meter data is obtained from a meter that is to monitor media presented by a media device.

Example 38 includes an apparatus comprising at least one memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry including logic gate circuitry to perform one or more third operations, the processor circuitry to at least one of perform at least one of the first operations, the second operations or the third operations to determine whether a first condition to prune a reference media asset is satisfied, in response to a determination that the first condition is satisfied, determine whether a second condition to prune the reference media asset is satisfied, and in response to a determination that the second condition is satisfied segment the reference media asset into a plurality of segments based on a length of the reference media asset, prune a first one of the segments, and retain a second one of the segments in a database to compare with meter data to credit media exposure associated with the reference media asset.

Example 39 includes the apparatus of example 38, wherein the first condition is satisfied when the reference media asset has been stored in the database for at least a time threshold.

Example 40 includes the apparatus of example 38, wherein the processor circuitry to at least one of perform at least one of the first operations, the second operations or the third operations to access a history of media exposure credited to the reference media asset, the history associated with a first time period, and determine, based on the history, an exposure frequency for the reference media asset in the first time period.

Example 41 includes the apparatus of example 40, wherein the second condition is satisfied when the exposure frequency does not exceed a frequency threshold.

Example 42 includes the apparatus of example 41, wherein the history is a first history, the exposure frequency is a first exposure frequency, and the processor circuitry to at least one of perform at least one of the first operations, the second operations or the third operations to access a second history of media exposure credited to the reference media asset, the second history associated with a second time period, determine, based on the second history, a second exposure frequency for the reference media asset in the second time period, and determine that the second exposure frequency satisfies the frequency threshold.

Example 43 includes the apparatus of example 38, wherein the processor circuitry to at least one of perform at least one of the first operations, the second operations or the third operations to in response to a determination that the second condition is not satisfied, determine whether the reference media asset was segmented previously, and in response to a determination that the reference media asset was segmented previously, retrieve a complete version of the reference media asset from an archive, the complete version of the reference media asset including the first one of the segments previously pruned from the reference media asset.

Example 44 includes the apparatus of example 38, wherein the meter data is obtained from a meter that is to monitor media presented by a media device.

The invention claimed is:
1. A computing system comprising:
   at least one processor;
   a non-transitory computer-readable medium having stored therein instructions that, upon execution by the at least one processor, cause the computing system to perform operations comprising:
      determining that a first condition to prune a portion of a reference media asset is satisfied;

determining, in response to determining that the first condition is satisfied, that a second condition to prune the portion of the reference media asset is satisfied;

segmenting, in response to determining that the second condition is satisfied, the reference media asset into a plurality of segments based on a length of the reference media asset;

pruning a first segment of the plurality of segments corresponding to the portion of the reference media asset; and storing a second segment of the plurality of segments in a database to compare with meter data to credit media exposure associated with the reference media asset.

2. The computing system of claim 1, wherein the first condition is satisfied when the reference media asset has been stored in the database for at least a time threshold.

3. The computing system of claim 1, wherein the operations further comprise:

accessing a history of media exposure credited to the reference media asset, the history associated with a first time period; and determining, based on the history, an exposure frequency for the reference media asset in the first time period.

4. The computing system of claim 3, wherein the second condition is satisfied when the exposure frequency does not exceed an exposure frequency threshold.

5. The computing system of claim 3, wherein the history is a first history, wherein the exposure frequency is a first exposure frequency, and wherein the operations further comprise:

accessing a second history of media exposure credited to the reference media asset, the second history associated with a second time period; and determining, based on the second history, a second exposure frequency for the reference media asset in the second time period.

6. The computing system of claim 5, wherein the operations further comprise determining that the second exposure frequency satisfies an exposure frequency threshold.

7. The computing system of claim 1, wherein the operations further comprise:

determining, based on determining that the second condition is not satisfied, that the reference media asset was segmented previously; and retrieving, based on determining that the reference media asset was segmented previously, a complete version of the reference media asset from an archive, the complete version of the reference media asset including the first segment of the plurality of segments previously pruned from the reference media asset.

8. The computing system of claim 1, wherein the meter data is obtained from a meter that is to monitor media presented by a media device.

9. A method comprising:

determining that a first condition to prune a portion of a reference media asset is satisfied;

determining, based on determining that the first condition is satisfied, that a second condition to prune the portion of the reference media asset is satisfied;

segmenting, based on determining that the second condition is satisfied, the reference media asset into a plurality of segments based on a length of the reference media asset;

pruning a first segment of the plurality of segments corresponding to the portion of the reference media asset; and storing a second segment of the plurality of segments in a database to compare with meter data to credit media exposure associated with the reference media asset.

10. The method of claim 9, wherein the first condition is satisfied when the reference media asset has been stored in the database for at least a time threshold.

11. The method of claim 9, further comprising:

accessing a history of media exposure credited to the reference media asset, the history associated with a first time period; and determining, based on the history, an exposure frequency for the reference media asset in the first time period.

12. The method of claim 11, wherein the second condition is satisfied when the exposure frequency does not exceed a frequency threshold.

13. The method of claim 11, wherein the history is a first history, wherein the exposure frequency is a first exposure frequency, and further comprising:

accessing a second history of media exposure credited to the reference media asset, the second history associated with a second time period; and determining, based on the second history, a second exposure frequency for the reference media asset in the second time period.

14. The method of claim 13, further comprising:

determining that the second exposure frequency satisfies an exposure frequency threshold.

15. The method of claim 9, further including comprising:

determining, based on determining that the second condition is not satisfied, that the reference media asset was segmented previously; and retrieving, based on determining that the reference media asset was segmented previously, a complete version of the reference media asset from an archive, the complete version of the reference media asset including the first segment of the plurality of segments previously pruned from the reference media asset.

16. The method of claim 9, wherein the meter data is obtained from a meter that is to monitor media presented by a media device.

17. A non-transitory computer-readable storage medium having stored therein instructions that, upon execution by at least one processor, cause perform of operations comprising:

determining that a first condition to prune a portion of a reference media asset is satisfied;

determining, based on determining that the first condition is satisfied, determining that a second condition to prune the portion of the reference media asset is satisfied;

segmenting based on determining that the second condition is satisfied, the reference media asset into a plurality of segments based on a length of the reference media asset;

pruning a first segment of the plurality of segments corresponding to the portion of the reference media asset; and storing a second segment of the plurality of segments in a database to compare with meter data to credit media exposure associated with the reference media asset.

18. The non-transitory computer-readable storage medium of claim 17, wherein the first condition is satisfied when the reference media asset has been stored in the database for at least a time threshold.

19. The non-transitory computer-readable storage medium of claim 17, wherein the operations further comprise:
- accessing a history of media exposure credited to the reference media asset, the history associated with a first time period; and
- determining, based on the history, an exposure frequency for the reference media asset in the first time period.

20. The non-transitory computer-readable storage medium of claim 19, wherein the second condition is satisfied when the exposure frequency does not exceed a frequency threshold.

\* \* \* \* \*